United States Patent Office 3,249,514
Patented May 3, 1966

3,249,514
PRODUCTION AND USE OF AMYLOGLUCOSIDASE
Harold Eli Bode, 14170 Onaway, Cleveland, Ohio
No Drawing. Filed Nov. 18, 1963, Ser. No. 324,257
11 Claims. (Cl. 195—66)

This application is a continuation-in-part of my copending application Serial No. 59,828, filed October 3, 1960, now abandoned. This invention relates to the production and use of amyloglucosidase. In one of its more particular aspects this invention relates to the fermentative production of amyloglucosidase which is of a purity previously not obtainable.

Heretofore, certain strains of fungi belonging to the *Aspergillus niger* group and certain strains of Rhizopus species have been found to produce the enzyme amyloglucosidase which catalyzes the hydrolysis of starch, dextrins or maltose to dextrose. This enzyme has also been referred to as glucamylase, glucogenic enzyme, starch glucogenase, or gamma-amylase. Purified amyloglucosidase has been shown to catalyze the hydrolysis of the alpha-D-(1→4), the alpha-D-(1→6), and the alpha-D-(1→3) glucosidic bonds of oligosaccharides.

The fungal strains producing amyloglucosidase have also been found to produce at the same time appreciable quantities of other enzymes, including alpha-amylase, transglucosidase, protease and sometimes lipase. Of particular importance in connection with the production of high yields of dextrose from starch by such amyloglucosidase enzyme preparations are the presence and amounts of transglucosidase and alpha-amylase. Transglucosidase promotes the formation, particularly from maltose, of unfermentable dextrose polymers and oligosaccharides such as panose which contain alpha-D-(1→6) glucosidic linkages. When such enzymatic synthesis of unfermentable carbohydrates by the action of transglucosidase occurs, lower yields of dextrose are obtained from saccharification of starch. Alpha-amylase acts on starch to catalyze the production of hydrolysis products of lower molecular weight including maltose. It may in this way hasten the action of amyloglucosidase in producing dextrose, but on the other hand it produces oligosaccharides susceptible to the action of transglucosidase and may thus contribute to lower dextrose yields with enzyme preparations containing appreciable quantities of transglucosidase.

A considerable number of strains of the *Aspergillus oryzae*, *Aspergillus niger* and Rhizopus groups have been tested for amyloglucosidase production as well as for the simultaneous production of transglucosidase and alpha-amylase. To date the best yields of amyloglucosidase have been obtained with certain strains of the *Aspergillus niger* and Rhizopus groups, but all of the strains heretofore investigated have produced appreciable amounts of transglucosidase.

When tested by a transglucosidase activity assay procedure, the various amyloglucosidase enzyme preparations of the prior art have such alpha-amylase and transglucosidase activities that about from 23% to 77% of a maltose substrate is converted to unfermentable sugars. The presence of transglucosidase in usual amyloglucosidase preparations has been generally recognized and a number of patents have been issued on methods for reducing the transglucosidase content of amyloglucosidase preparations for use in making dextrose from starch.

However, these methods are cumbersome and expensive especially when applied to the commercial enzymatic conversion of the starch of amylaceous materials to dextrose.

Accordingly, it is an object of this invention to provide a means for producing amyloglucosidase in high yield without substantial concomitant production of undesired enzymes.

Another object of this invention is to provide a substantially pure amyloglucosidase, that is, amyloglucosidase of a sufficient purity to obviate the need for extensive purification.

A further object of this invention is to provide a means for realizing a high dextrose yield in the starch conversion of amylaceous materials.

Another object of this invention is to provide amyloglucosidase which is substantially free of alpha-amylase, transglucosidase, protease, lipase and other contaminating enzymes.

Other objects and advantages of this invention will be apparent from a study of the following detailed disclosure and description.

It has now been found that certain mutants produced from a typical black Aspergillus isolated from soil produce almost negligible amounts of transglucosidase, alpha-amylase and other enzyme contaminants. A typical mutant culture of this type has been characterized and deposited with the American Type Culture Collection as *Aspergillus foetidus*, strain Bode Mutant A103–1. It has been assigned the ATCC accession number 14916.

The characteristics of this mutant are as follows: On Czapek agar, colonies spreading slowly, with abundant black heads above a yellow or pale orange mycelium which is yellow to orange on the underside. Conidiophores up to $500\mu$ long, surmounted by vesicles about $30\mu$ in diameter, but occasionally reaching $75\mu$ diameter. Spore heads $80\mu$ to $130\mu$ in diameter, with occasional heads up to $225\mu$ in diameter. Primary sterigmata $7\mu$ to $15\mu$ by $4\mu$ to $6\mu$; secondary sterigmata the same size, or in large heads a little smaller than the primary sterigmata. Conidia globose $4\mu$ to $5\mu$ in diameter, minutely roughened with color bars or spinules. Colonies on Czapek agar have a characteristic earthly odor similar to that of an actinomycete. This odor has not been observed in any other Aspergillus.

The mutant *Aspergillus foetidus* ATCC 14916 and similar mutants capable of producing a substantially pure amyloglucosidase as above described may be produced by means of a process of spore selection following an ultra-violet irradiation of spores produced by an organism of the *Aspergillus niger* series.

In carrying out this process a culture on agar of the organism is allowed to grow until it is well sporulated. The spores are gathered by flooding the surface of the culture with sterile water, containing preferably a dispersing agent such as sodium lauryl sulfate, adding several sterile glass beads, and then shaking gently until a dispersion of the spores is obtained. This dispersion is then drawn off, with the glass beads, into a sterile bottle, shaken vigorously and then filtered aseptically into a sterile container. Loose sterile cotton may be used for the filtering medium, since this allows passage of the well dispersed spores.

A spore count is made on the filtered dispersion by the well-known method of plate culturing several progressive dilutions of the spore dispersion and then counting the colonies, at an appropriate dilution, that have grown from the spores. The remainder of the spore dispersion is maintained under refrigeration until completion of the spore count. Then the spore dispersion is diluted with distilled water so that the spore population will be of the order of about one-half to about one and one-half million spores per ml.

Samples of this diluted spore dispersion are placed in small, sterile Petri dishes which are placed under an ultraviolet lamp, such as is used, for example, for ultraviolet sterilization. Samples are irradiated for different intervals of time and then the surviving spores at each irradiation time are counted, again by the plate culturing method, outlined above.

Usually, an irradiated sample is selected for further study in which 99%, or more, of the spores fail to survive irradiation. Colonies that grow in the plate counts from the 1%, or less, of surviving spores are immediately tested for their capacity to produce amyloglucosidase, by growing a sample of each in suitable liquid culture media, by procedures and tests that will be given more fully hereinafter. It is advisable to test as many of the colonies grown from the surviving spores as is practicable, in order to obtain at least one that shows a significantly higher capacity to produce amyloglucosidase. This is because of the very small proportion of the surviving spores which are found to have an increased capacity for producing the enzyme.

The cultures obtained by the method described above are then grown in a suitable fermentation medium to produce amyloglucosidase. In general the fermentation medium comprises a mixture of a source of carbohydrate and a source of protein. The carbohydrate source may in general be any amylaceous material or hydrolysis product thereof. For example a low molecular weight polysaccharide such as maltose or a hydrolysis product of starch or ground corn which has been subjected to hydrolysis by acid or enzyme, for example, by bacterial amylase, may be used. Where the medium is produced by an enzymatic treatment it is necessary that the medium be sterilized prior to addition of the amyloglucosidase elaborating culture in order to insure that enzyme contamination of the desired amyloglucosidase is minimized.

The protein source may be any convenient protein nutrient material such as corn steep liquor or other commercially available protein materials which are generally used in fermentation media.

pH control of the medium is generally not required since the pH of the medium approximates the optimum pH for amyloglucosidase producing activity of the organism.

The temperature of the medium during fermentation should preferably be maintained at about 32° C. However, the temperature may range from about 20° C. to 35° C. Moderate superatmospheric pressures are desirable, for example, about from 15 p.s.i.g. to 30 p.s.i.g. Continuous aeration and agitation during the course of fermentation, which may extend about from 72 hours to 96 hours results in optimization of yields of amyloglucosidase.

Since this invention relates to an amyloglucosidase of high amyloglucosidase activity and low transglucosidase, alpha-amylase and protease activities, convenient methods for the determination of these various activities are provided as follows:

*Determination of amyloglucosidase activity.*—The substrate is a solution containing 4.0 g. of soluble starch (moisture-free basis) and 5.6 ml. of 1.1 M acetate buffer, pH 4.2, per 100 ml. Exactly 50 ml. of the buffered starch solution is pipetted into a 100 ml. volumetric flask and equilibrated in a water bath at 60° C. for 15 minutes. Then 1.0 ml. of enzyme solution, properly diluted so that 20% to 30% hydrolysis will occur during the incubation period, is added. After exactly 60 minutes of incubation in the water bath at 60° C. the solution is adjusted to pink phenolphthalein point by adding 2 N sodium hydroxide. The solution is then cooled to room temperature and diluted to volume with distilled water. Reducing sugar, calculated as dextrose, is determined on the diluted sample and on a blank solution treated in the same way but with no enzyme added by the well-known Schoorl method. Amyloglucosidase is calculated from the formula:

$$A = \frac{S-B}{E}$$

where, $A$ = amyloglucosidase activity, units per gram (or ml.) of enzyme preparation.

$S$ = reducing sugars in enzyme converted sample, grams per 100 ml. diluted sample.

$B$ = reducing sugars in blank, grams per 100 ml. diluted sample.

$E$ = amount of enzyme used, grams (or ml.) per 100 ml. diluted sample.

*Determination of transglucosidase activity.*—A solution of maltose is prepared by dissolving 200 g. C.P. maltose in distilled water and diluting to 500 ml. Exactly 50 ml. is pipetted into a 100 ml. volumetric flask. To the flask is added 5.0 ml. of 1.0 M acetate buffer, pH 4.5. After mixing, an amount of enzyme preparation containing 2.8 units of amyloglucosidase activity is added. The flask is placed in a 60° C. water bath. After 72 hours the flask is placed in a boiling water bath for 15 minutes, then cooled and the contents transferred quantitatively to a 150 ml. beaker. The solution is adjusted to pH 4.8 with 1 N sodium hydroxide solution, transferred to a 500 ml. Erlenmeyer flask, and diluted to about 200 ml. Ten g. of active dry baker's yeast is added, and the flask shaken continuously for 5 hours at 30° C. The contents are then transferred to a 250 ml. volumetric flask and diluted to volume. Two hundred ml. are then centrifuged at 2000 r.p.m. for 15 minutes and the supernatant liquor decanted into a dry flask. Fifty ml. of this liquor is pipetted into a 70 ml. test tube, 5 ml. of 3.0 N hydrochloric acid is added, the test tube is stoppered loosely, and is heated in a boiling water bath for 3 hours and then cooled in an ice bath. The contents of the tube are transferred quantitatively to a 100 ml. volumetric flask, adjusted to pink phenolphthalein end point with 1 N sodium hydroxide and diluted to volume. Reducing sugar, calculated as dextrose, is determined on an aliquot of the final solution. To obtain a correction for reducing sugar contributed by the yeast, a control sample is included in which 20 g. of pure dextrose is used in place of maltose, no enzyme being added. The reducing sugar value of the enzyme-converted sample, corrected for reducing sugars contributed by the yeast, represents the unfermentable sugars synthesized by the enzyme preparation. The results are calculated as percent of maltose converted to unfermentable sugars.

Since the two enzymes amyloglucosidase and transglucosidase compete for the same substrate maltose, the results may be expressed as the ratio of transglucosidase activity to amyloglucosidase activity:

$$TG/AG = \frac{X}{100-X}$$

where $X$ = percent of maltose converted to unfermentable sugars.

*Determination of alpha-amylase activity.*—Alpha-amylase determinations are made by the modified Sandstedt, Kneen and Blish procedure as published in Cereal Laboratory Methods, 7th edition, section 22-01. The results are calculated as SKB units per gram (or ml.).

*Determination of protease activity.*—The substrate is a 0.1% solution of casein buffered at pH 7.4. Exactly 50 ml. of the buffered casein solution is pipetted into a 125 ml. Erlenmeyer flask and equilibrated in a water bath at 40° C. for 15 minutes. Then 1.0 ml. of enzyme solution is added, properly diluted so that the absorbance at 660 mμ in the final step falls in the range of 0.300 to 0.500. After exactly 35 minutes the reaction is stopped by adding 25 ml. of 2 M acetate buffer, pH 4.0, swirling the contents of the flask to achieve rapid mixing. The mixture is then filtered through dry filter paper, and a 2.0 ml. aliquot of the filtrate is placed in a 25 mm. colorimeter tube. Three ml. of 0.8 N sodium hydroxide is added and mixed. One ml. of Folin-Ciocalteu phenol reagent is added by blowing directly into the solution. The mixing is completed by swirling the tube. At least 5 minutes but less than 20 minutes after addition of the phenol reagent the absorbance at 660 mμ ($A_{660}$) is read in a photoelectric colorimeter with the instrument set to zero with a blank. The blank is prepared by using 1 ml.

of water instead of enzyme sample and carrying through all the steps of the assay procedure. Arbitrary protease units are calculated from the formula:

$$NU = \frac{A_{660} \times F}{W}$$

where, $NU$ = arbitrary Northrop Units per gram of enzyme preparation.
$A_{660}$ = absorbance at 660 m$\mu$.
$W$ = amount of enzyme in milligrams added in the 1.0 ml. enzyme sample.
$F$ = factor depending upon colorimeter and type of enzyme being assayed.

The invention will be better understood by reference to the following examples which are included for purposes of illustration and should not be construed as in any way limiting the present invention.

Example 1

This example illustrates the process of irradiation and spore selection by which *Aspergillus foetidus* ATCC 14916 was isolated and which can be used to produce other mutants which are capable of producing substantially pure amyloglucosidase in accordance with this invention.

An agar culture of an organism of the *Aspergillus niger* series was allowed to grow until the organism was well sporulated. Under aseptic conditions, the surface of the agar culture was flooded with 10 ml. of a sterile solution consisting of 0.001 g. of sodium lauryl sulfate per 100 ml. of water. Three sterile glass beads were added, the culture flask closed and the flask gently shaken to assist suspension of the spores in the solution. The spore suspension was then removed, with the glass beads, into a small stoppered bottle. This bottle and contents were shaken vigorously for 10 minutes. The spore dispersion liquor was filtered through a small sterile cotton pad into a sterile bottle. The cotton filter pad was washed with 5 ml. of sterile water and this wash water was added to the filtered spore suspension.

Dilutions of the spore suspension were made with sterile water in proportions of 1:10, 1:100 and 1:1000. One tenth ml. of these dilutions was then used to inoculate Czapek agar plates in 14 cm. Petri dishes. Czapek agar is a well-known synthetic medium of inorganic salts, sucrose and agar. The plates were incubated for 5 days at 30° C., and the colonies that grew from each original spore were counted. From these counts, the spore population of the original spore suspension was calculated and then adjusted by dilution with sterile water, to a value of one million per ml. The spore suspension was refrigerated at 5° C. during the counting.

Samples of 10 ml. each of the diluted spore suspension were placed in 6 cm. Petri dishes under an ultraviolet sterilizing lamp for different periods of time up to 10 minutes irradiation, at which time substantially all of the spores had been killed. The dishes were shaken, to agitate the contents, during the irradiation periods.

A count of surviving spores was made on each irradiated sample, by plating out dilutions of each on Czapek agar in 14 cm. Petri dishes, and incubating the plates for 5 days at 30° C. It was determined that at 6 minutes irradiation about 99.5% of the spores had been killed. From an agar plate on which had grown about 50 colonies from the spores that had survived 6 minutes irradiation, slant cultures were immediately made of each by inoculating Czapek agar in test tubes and incubating for 4 days at 30° C. Three duplicate agar plates were similarly treated.

All exposures to irradiation, plating and counting work, as well as preparation of the first slant cultures from the surviving spores, were done in a dark room, illuminated only by a dark red light bulb.

*Determination of amyloglucosidase production capacity.*—Loop-full samples of each above described slant culture were used to seed heat sterilized, 100 ml. samples of a dilute corn mash in water. The mash contained 25 g. of ground yellow dent corn and 20 g. of concentrated (about 50% solids) corn steepwater per liter adjusted to pH 6.0 with NaOH. (Corn steepwater is the liquor in which corn has been steeped to soften it, in the first stages of the corn wet-milling process, and after evaporation, is sold as a microorganism growth nutrient.) These 100 ml. lots of inoculated corn mash were shaken in flasks at 30° C. for 72 hours.

The fermented, dilute corn mashes, containing the actively growing survivors of the irradiated spores, were used as seed samples to ferment more concentrated corn mashes. To this end, 15 ml. of each fermented, dilute corn mash was added as seed to a heat sterilized corn mash consisting of 20 g. of ground yellow dent corn, 4 g. of concentrated corn steepwater, 0.1 g. of $(NH_4)_2SO_4$ and 0.1 g. of $K_2HPO_4$, in 185 ml. of water, the mash having been adjusted to pH 6.0 with NaOH. The culture flasks were lightly stoppered with cotton and were incubated by shaking at 250 oscillations per minute, at 30° C. for 96 hours. The cultures were then filtered through filter paper and the culture filtrates preserved (by adding toluene and refrigerating at 5° C.) until their amyloglucosidase activity was determined as described above.

By the irradiation and culture growth procedures given in this example, a culture was obtained in which the genes responsible for amyloglucosidase production had been so mutated by the ultraviolet irradiation that the organism produced 2.1 times as many amyloglucosidase units when allowed to act under the standard fermentation procedures above described as the parent, non-irradiated culture.

That is to say, when the parent microorganism culture was treated in accordance with this invention, a mutant strain was obtained, *Aspergillus foetidus* ATCC 14916, that had approximately twice the capacity to produce amyloglucosidase, compared to the parent, under the same fermentation conditions.

Example 2

The procedures given in Example 1 were repeated, using for the test organism the mutant described (*Aspergillus foetidus* ATCC 14916).

The mutant produced in this manner was transplanted and grown in successive slant cultures in series, using the preceding slant culture growth to seed the next slant in the series. The twentieth slant culture of the mutant of *Aspergillus foetidus* ATCC 14916 was tested and found to produce 3.9 times as many amyloglucosidase units as the parent non-irradiated culture and 1.9 times as many as *Aspergillus foetidus* ATCC 14916 showing that the mutation in this strain in respect to amyloglucosidase production capacity was stable.

Example 3

Another mutant strain of *Aspergillus foetidus* obtained in carrying out the procedures of Example 2, was found to have the capacity to produce 3.3 times as many amyloglucosidase units as the parent non-irradiated culture when tested as the first slant culture of the spores after irradiation. This strain was additionally propagated by 19 additional slant culture growths in series over a period of four months. Each of the slant growths of this series was tested for amyloglucosidase production capacity, which was found to increase up until about the tenth slant in the series when it leveled off at a test value of 4.1 times the amyloglucosidase activity of the parent.

In other, not too rare cases, a mutant was observed which showed a significant increase in amyloglucosidase production capacity but which after several successive slant transfers decreased in this capacity until finally it was at a level no higher than the non-irradiated parent. In these cases the mutation was obviously unstable and these mutants were discarded.

Accordingly, in order to obtain a stable mutant with the highest amyloglucosidase producing capacity by irradiation it is advisable to propagate the mutant under favorable conditions as soon as possible and to do so through several generations before making a final selection.

The practical results of this invention are of considerable economic importance for if, with a given capital outlay for an enzyme producing plant, a given cost for raw materials and a given charge for labor and power, amyloglucosidase at a standard activity can be made at a certain price per pound, and if a mutant is produced, as for example, in Example 3, which has about four times the amyloglucosidase producing capacity of other commonly used organisms, then it follows that (with the same plant, materials, labor and power) the cost of producing the enzyme will be only about one-fourth as much. In many industrial uses where this enzyme might be used, such as the possible commercial production of dextrose from starch or other amylaceous materials, such as corn, by enzymatic hydrolysis, this 75% reduction in cost for the enzyme can be a determining factor as to whether or not the process would be economically feasible.

While the foregoing examples have demonstrated that *Aspergillus foetidus* ATCC 14916 and mutants thereof are capable of producing amyloglucosidase in commercially attractive high yields and have taught the method of obtaining said mutants, an even more outstanding advantage of the instant invention resides in the previously mentioned substantially pure character of the amyloglucosidase thereby produced. As can be appreciated by those skilled in the art the effectiveness of amyloglucosidase production depends not only upon how much amyloglucosidase can be produced by a given organism but also upon how little contaminating enzymes are produced along with the amyloglucosidase. In addition the amount of purification required to provide an amyloglucosidase of the desired degree of purity is also an important factor.

The use of cultures of *Aspergillus foetidus* ATCC 14916 and mutants thereof in the process of this invention has been found effective to produce, without any additional purification, a substantially pure amyloglucosidase, that is, one which is substantially free of contaminating enzymes which when present result in lower yields of dextrose in starch conversions utilizing such contaminated amyloglucosidase. This effect will be demonstrated in the following examples.

*Example 4*

This example illustrates the marked reduction in transglucosidase and alpha-amylase activities realized in amyloglucosidase production according to the process of this invention.

Amyloglucosidase preparations were obtained by submerged culture of *Aspergillus niger* NRRL 330, of *Aspergillus foetidus* ATCC 14916 and of a mutant of *Aspergillus foetidus* ATCC 14916 produced according to the method of Example 2. *Aspergillus niger* NRRL 330 is a known amyloglucosidase producer of the prior art. The cultures were grown at 32° C. with continuous aeration and agitation. The medium employed was prepared by mixing the ingredients in the following proportions and manner; 25 g. of corn steep liquor concentrate were added to 1000 ml. of water, the pH adjusted to 6.0 by addition of sodium hydroxide solution, followed by addition of 150 mg. of commercial bacterial amylase and 150 g. of ground yellow corn. The mixture was then heated in a closed fermentor with continuous agitation to a steam pressure of 15 p.s.i.g. (121° C.), held for 30 minutes at that pressure and then cooled to 32° C. The cooled mash was inoculated with about 5% by volume of a 24 hour vegetative culture of the appropriate organism grown in submerged culture on a similar medium, and incubated at 32° C. under 15 p.s.i.g. pressure with continuous aeration and agitation until maximum amyloglucosidase production was reached as determined by assay of samples of the fermenting beer. This usually required 72 to 96 hours. The mycelium was then filtered off and the enzyme precipitated from the clear filtrate by addition of alcohol. The precipitate was collected by filtration and dried under vacuum. Precipitated enzyme products produced from the various cultures in this way were assayed for enzymic activities with the results shown in Table 1 below:

TABLE 1

| | A. niger NRRL 330 | A. foetidus ATCC 14916 | Mutant of A. foetidus ATCC 14916 |
|---|---|---|---|
| Amyloglucosidase Assay | [1] 55.6 | [2] 28.3 | [1] 160 |
| Transglucosidase, percent Unfermentables Formed from Maltose | 23 | 15 | 3.8 |
| Alpha-amylase, SKB, units/g | 1,018 | 124 | 128 |
| Protease, N U/g | 3.30 | 1.0 | 1.95 |
| TG/AG Ratio | 0.30 | 0.171 | 0.04 |
| SKB/AG Ratio | 18.3 | 4.3 | 0.8 |

[1] Units/g.
[2] Units/ml.

*Example 5*

Amyloglucosidase preparations obtained by a submerged culture of *Aspergillus niger* NRRL 330 and a mutant of *Aspergillus foetidus* ATCC 14916 produced according to the method of Example 2 were tested for transglucosidase activity by the use of $C^{14}$ labeled radioactive maltose. Separate solutions containing 0.2 M $C^{14}$ labeled maltose and about 2 units of amyloglucosidase per ml. of the enzyme preparations were incubated for 4 hours at room temperature. The sugars in the solutions were then separated by ascending paper chromatography and determined quantitatively by radioactivity counting. The results are shown in Table 2.

TABLE 2

| Enzyme Source | Maltose Hydrolyzed, Percent | Panose Formed, Percent of Maltose Hydrolyzed |
|---|---|---|
| A. niger NRRL 330 | 41 | 28 |
| Mutant of A. foetidus ATCC 14916 | 55 | 1.9 |

*Example 6*

In a 2500 gallon fermentor were mixed 2000 gallons of water and 415 pounds of corn steep liquor concentrate with agitation at 172 r.p.m. The pH was adjusted to 6.0, addition of 30 pounds of 50% sodium hydroxide being required. There was then added 3350 pounds of ground yellow corn, followed by 27 ounces of a commercial bacterial amylase suspended in 1 gallon of water, and 500 ml. of a commercial anti-foam agent. The fermentor was closed, and the contents heated by means of steam in the jacket to 15 p.s.i.g. (121° C.) and held at this pressure for 30 minutes to sterilize the mash. The mash was then cooled to 32° C. and inoculated with 175 gallons of seed culture of a mutant of *Aspergillus foetidus* ATCC 14916 produced according to the method of Example 2, grown for 24 hours on a medium of similar composition in a seed tank with continuous aeration and agitation. The fermentation was maintained at 32° C. and 15 p.s.i.g. pressure with agitation at 172 r.p.m. and aeration at 60 c.f.m. until maximum amyloglucosidase activity had been reached, 5.5 units per ml., which occurred in 86 hours. The mycelium was then filtered on a vacuum precoat filter. The clear filtrate was evaporated under vacuum at a temperature below 35° C. to a liquid concentrate assaying 30 units of amyloglucosidase per ml. This product by the procedure for determining transglucosidase activity gave 2.3% of maltose converted to unfermentable sugars. The alpha-amylase assay was 25.2 SKB units per ml. and protease assay too low to permit calculation of units.

Example 7

An amyloglucosidase material produced in quantity by the method of Example 6, designated Enzyme D, was compared with a material also obtained from a large scale fermentation by a selected Rhizopus strain, designated Enzyme R. The enzyme assays are shown in Table 3.

TABLE 3

| Enzyme | Amyloglu-cosidase, units/gram | Transglu-cosidase, Percent Unfer-mentables Produced | Alpha-amylase SKB, units gram | Enzyme Ratios TG/AG | SKB/AG |
|---|---|---|---|---|---|
| D | 26.3 | 1.99 | 29 | 0.002 | 1.1 |
| R | 50.2 | 34 | 633 | 0.515 | 12.6 |

Example 8

A slurry of 35% corn starch in water was prepared and 0.05%, based on the weight of starch, of a commercial bacterial amylase was added. The mixture was heated gradually to 85° C. and held at this temperature for 10 minutes during which heating period the starch was gelatinized and liquefied by means of bacterial amylase. The mixture was cooled to 60° C. and pH adjusted to 4.3 by means of hydrochloric acid. To separate portions of the liquefied starch were added sufficient of each of the enzymes of Example 7 so as to correspond to a proportion of 80 units of amyloglucosidase per pound of starch. Samples were taken after incubation at 60° C. for 72 and 96 hours and analyzed for sugar. The results expressed as dextrose equivalent (DE) which is defined as total reducing sugars expressed as dextrose and calculated as percentage of the total dry substance are shown in Table 4.

TABLE 4

| Enzyme | DE after digestion for— | |
|---|---|---|
| | 72 hours | 92 hours |
| D | 99.4 | 100.1 |
| R | 80.2 | 78.7 |

As can be seen from the foregoing example it is desirable before applying amyloglucosidase to the amylaceous material, which is to be converted to dextrose, to use a small amount of a liquefying amylase such as a bacterial amylase. The amylase may be used in a concentration of about from 0.05% to 0.15% by weight of the starch. The treatment with the amylase is most satisfactory when conducted at a pH in the range of about from pH 6.0 to pH 7.5 and at a temperature of about from 60° C. to 90° C. The liquefaction of the starch content of the amylaceous material being treated is readily accomplished in a period of about from 10 minutes to 40 minutes under the above preferred conditions.

In place of liquefaction with an amylase there may be used an acid hydrolysis. The use of hydrochloric acid for this purpose is well known. Such treatment requires that hydrochloric acid be added to a pH of about from pH 1.5 to pH 2.0 The temperature is then brought up to about from 130° C. to 135° C. at a pressure of about from 35 p.s.i.g. to 40 p.s.i.g. which may take about from 17 minutes to 20 minutes. Heating under pressure is preferred since the desired degree of hydrolysis may be accomplished in a shorter length of time. In general, once the required temperature is reached it is necessary to maintain the mixture at this temperature for only a relatively short period of time, for example, for about 1 minute in order to attain a degree of hydrolysis which results in about a 15 to 18 DE.

Following liquefaction of the starch content of the amylaceous material to be converted to dextrose the treatment of the liquefied starch with the above described substantially pure amyloglucosidase of this invention may be conveniently accomplished by using about from 70 units to 90 units of amyloglucosidase per pound of starch. The pH, which is preferably adjusted to one in the range of about from pH 3.8 to pH 5.5, may be adjusted by means of adding an appropriate acid such as hydrochloric acid following the previous treatment with an amylase or, if an acid hydrolysis has been utilized, the pH may be adjusted to the desired level by adding an appropriate base such as calcium hydroxide. The temperature is first lowered to one in the range of about from 50° C. to 65° C. and then maintained throughout the conversion at approximately this same temperature. The time required for the conversion may vary from about 24 hours to 136 hours. An especially preferred period is from about 45 hours to 90 hours.

Example 9

The enzyme preparations of Example 7 were compared in an experiment using acid thinned starch. The 35% solids suspension of corn starch was thinned and acid hydrolized to 15 DE by adding hydrochloric acid and heating under pressure. The pH was adjusted to 4.3 and sufficient of each enzyme to correspond to a proportion of 80 units of amyloglucosidase per pound of starch was added to separate portions of the liquefied starch. After incubation for 72 hours at 60° C. samples of each digest were filtered, and sugar determinations made on both filtered and unfiltered samples. The results are shown in Table 5.

TABLE 5

| Enzyme | Unfiltered Digest, DE | Filtered Digest, DE |
|---|---|---|
| D | 93.3 | 96.9 |
| R | 88.2 | 92.1 |

Example 10

A slurry of 35% by weight of pearl corn starch was prepared and 0.05%, based on the weight of starch, of a commercial bacterial amylase was added. The mixture was heated gradually to 85° C. and held at this temperature for 10 minutes. The mixture was cooled to 60° C., pH adjusted to 4.0, and a liquid amyloglucosidase preparation obtained by the method of Example 6 was added corresponding to 80 units of amyloglucosidase per pound of starch. The mixture was held at 60° C., samples being removed for analyses at 24 hour intervals. After 24 hours the DE was 93, after 48 hours the DE was 100, and after 72 hours the DE was 100. At the end of 72 hours the digest was treated with carbon and filtered, the DE of the filtrate being 100. The filtrate was evaporated to 80% solids, and the syrup poured into a pan and allowed to solidify in a cold room. The analysis of the solid product showed 9.1% moisture, and on the dry basis it analyzed 99.89% total sugars, 99.23% dextrose and 0.13% ash.

Example 11

Another conversion of corn starch was conducted as in Example 10. After incubation for 64 hours at 60° C. the DE was 96. The digest was treated with carbon and filtered, then the filtrate was passed through columns containing cation and anion exchange resins. The solution was evaporated to 80% solids, and the syrup allowed to solidify in a pan in the cold room. The analysis of the product showed 9.0% moisture, and on the dry basis it analyzed 99.0% total sugars, 98.4% dextrose, and was free of ash and nitrogen.

Example 12

A slurry of about 35% of wet-milled degermed corn was adjusted to pH 6.1 by addition of calcium hydroxide. The starch was liquefied by adding 0.08% of a commercial bacterial amylase, heating gradually to 85° C. and holding at this temperature for 10 minutes. The mixture was cooled to 60° C., pH adjusted to 4.2, and a liquid amyloglucosidase preparation obtained by the method of Example 6 was added corresponding to 80 units of amyloglucosidase per pound of dry solids. The mixture was held at 60° C., samples being removed for analysis at intervals. After 24 hours the DE was 75, after 48 hours the DE was 77, after 110 hours the DE was 78 and after 136 hours the DE was 79. The digest was filtered, the DE of the filtrate being 98. After two carbon treatments and filtrations, the filtrate was concentrated to 77% solids. The syrup was poured into a pan and allowed to solidify in a cold room.

These data clearly show that substantially pure amyloglucosidase can in fact be produced and utilized for converting starch to dextrose by means of the process of this invention.

In summary this invention provides a process for producing substantially pure amyloglucosidase which is contaminated with only exceptionally small quantities of transglucosidase, alpha-amylase and other contaminating enzymes and its use in converting the starch present in amylaceous materials to dextrose. The process utilizes the fermentation of a suitable carbohydrate medium using a novel fungal culture of *Aspergillus foetidus* ATCC 14916 or a mutant thereof.

What is claimed is:

1. A process for the production of amyloglucosidase which comprises fermenting a carbohydrate medium with a culture of *Aspergillus foetidus* selected from the group consisting of *Aspergillus foetidus* ATCC 14916 and mutants thereof.

2. A process according to claim 1 wherein the carbohydrate medium contains a source of protein.

3. A process for the production of amyloglucosidase which comprises inoculating a medium comprising a source of carbohydrate and a source of protein with a culture of *Aspergillus foetidus* selected from the group consisting of *Aspergillus foetidus* ATCC 14916 and mutants thereof and fermenting said medium at a temperature of about from 20° C. to 35° C. and a pressure of about from 15 p.s.i.g. to 30 p.s.i.g. for about from 72 hours to 96 hours.

4. A process for converting the starch present in an amylaceous material to dextrose which comprises liquefying the starch and treating the liquefied starch with a substantially pure amyloglucosidase produced by the fermentation of a carbohydrate medium with a culture of *Aspergillus foetidus* selected from the group consisting of *Aspergillus foetidus* ATCC 14916 and mutants thereof.

5. A process according to claim 4 wherein the starch is liquefied by means of acid hydrolysis.

6. A process according to claim 4 wherein the starch is liquefied by means of enzymatic hydrolysis with an amylase.

7. A process for converting the starch present in an amylaceous material to dextrose which comprises forming an aqueous slurry of the amylaceous material, liquefying the starch present in said amylaceous material and subjecting the liquefied starch to enzymatic hydrolysis at a pH of about from pH 3.8 to pH 5.5 and a temperature of about from 50° C. to 65° C., for a period of about from 24 hours to 136 hours with a substantially pure amyloglucosidase produced by the fermentation of a carbohydrate medium with a culture of *Aspergillus foetidus* selected from the group consisting of *Aspergillus foetidus* ATCC 14916 and mutants thereof.

8. A process according to claim 7 wherein the starch is liquefied by means of acid hydrolysis.

9. A process according to claim 7 wherein the starch is liquefied by means of enzymatic hydrolysis with an amylase.

10. A process according to claim 7 wherein the starch is liquefied by adding hydrochloric acid to said starch to a pH of about from pH 1.5 to pH 2.0, raising the temperature of the mixture to about from 130° C. to 135° C. at a pressure of about from 35 p.s.i.g. to 40 p.s.i.g. and maintaining the temperature of the mixture at this level for about 1 minute to produce a partially hydrolyzed starch of about from 15 DE to 18 DE.

11. A process according to claim 7 wherein the starch is liquefied by treating said starch with about from 0.05% to 0.15% by weight of bacterial amylase at a pH of about from pH 6.0 to pH 7.5 and a temperature of about from 60° C. to 90° C. for a period of about from 10 minutes to 40 minutes.

References Cited by the Examiner

UNITED STATES PATENTS 3,012,944   12/1961   Armbruster _____ 195—31

A. LOUIS MONACELL, *Primary Examiner.*